Oct. 6, 1925.
L. P. HUGHES
AUTOMOBILE BLOCK
Filed May 28, 1924
1,556,327
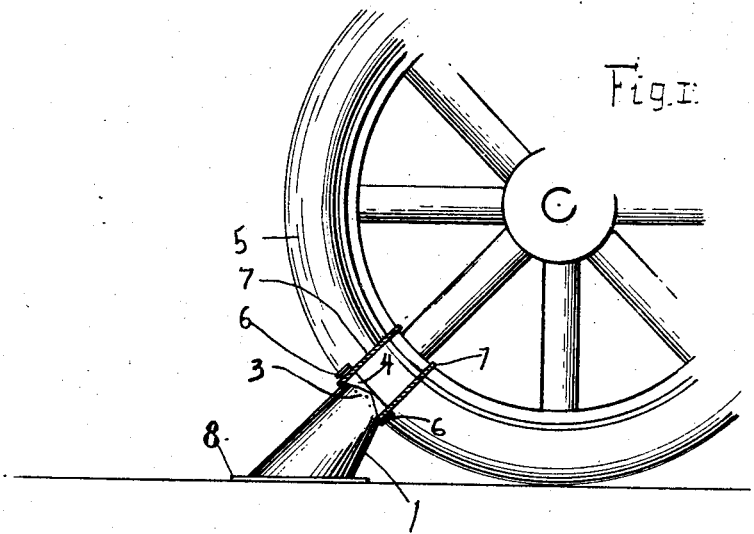
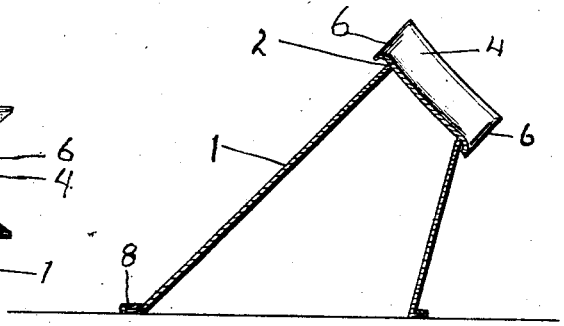
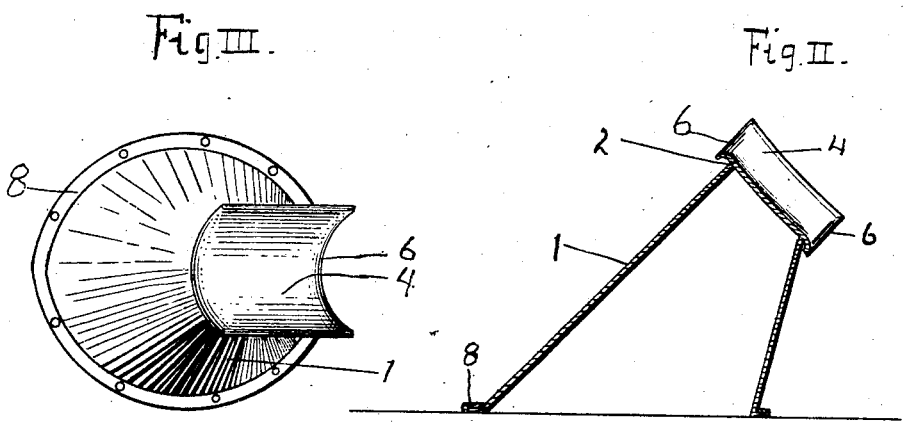
INVENTOR
Leo P. Hughes
BY
His ATTORNEY Patented Oct. 6, 1925.

1,556,327

UNITED STATES PATENT OFFICE.

LEO P. HUGHES, OF CLEVELAND, OHIO.

AUTOMOBILE BLOCK.

Application filed May 28, 1924. Serial No. 716,437.

*To all whom it may concern:*

Be it known that I, LEO P. HUGHES, a citizen of the United States, residing at Cleveland, in the county of Cuyahoga and State of Ohio, have invented some certain new and useful Improvements in Automobile Blocks; and I do hereby declare the following to be a full, clear, and exact description of the invention, such as will enable others skilled in the art to which it pertains to make and use the same.

My invention relates to a device for blocking automobiles in railway cars during transportation and has for its objects simplicity of construction, minimum amount of metal, easy application and positive rigidity.

To the accomplishment of the objects as above outlined, my device consists of a metallic structure of a frusto-conical contour provided with a base flange for fastening the same to the floor of a car and also provided with a seat for receiving the tire of the automobile wheel.

The invention further consists in so constructing the device that the same will assume a position enabling the center line thereof to be directed approximately on a radial line towards the axle of the automobile wheel.

In the drawings, Fig. I is a view showing the block as attached to the floor of a car and supporting the wheel of an automobile; Fig. II is a sectional view of the block showing the detailed construction, and Fig. III is a plan view of the same.

The main element or part of the device is of general frusto-conical shape and closed at its upper, or smaller end 2. Wings 3 are provided on each side of such body portion between which wings is located a seat 4 shaped to conform to the contour of the automobile tire 5 and provided at its front and rear edges with downwardly projecting flanges 6, 6, so as to prevent abrasion of the tire and also to form means for retaining in position the tie wires 7. While the device is particularly adapted to this method of tying the wheel down to the floor of the car, I do not limit myself to this method as various other ways may of course be adopted and used for tying.

The base of the frusto-conical body is provided with a flange 8 having a suitable number of apertures for permitting the driving of nails therethrough.

As best shown in Fig. II of the drawing, the body of the device when fastened to the floor is not only frusto-conical in cross-section, but in the plane coinciding with that of the wheel, the axis of said body is directed at an angle so as to incline in an approximately radial direction towards the axle of the automobile wheel. The front line of the body, in other words inclines downwardly substantially vertical or even inclines downwardly to the rear. By so constructing the device, the strain placed upon the block through the shunting of the freight cars in the switch yards is one of direct compression thereby eliminating the annoyance caused by the ripping of the blocks from the floor of the car when the car receives sudden shocks of above mentioned sort. In applying the blocks, it is customary to use at least six blocks to each automobile; two on each side of the rear wheels and one in front of each front wheel while in the majority of cases eight blocks are employed. In this manner the automobile is firmly braced from forward and backward motion while the ties prevent the automobile from "riding over" the blocks.

The seat 4 is preferably spot welded in between the wings 3 but may be bolted or otherwise secured if found more convenient. By spot welding, abrasion of the tire is eliminated without the necessary countersinking of the metal as would be necessary if bolts or rivets were employed.

While I have shown details of construction, I do not wish to be limited to these details except insofar as the annexed claims shall limit me as the same may be modified without departing from my invention.

Having thus described my invention, what I wish to claim is:

1. In an automobile block of the type set forth, the combination with a body portion of general frusto-conical form, of a seat at the smaller end thereof for the reception of the wheel of a vehicle, the axis of said body portion inclining with respect to its base so as to lie on a line approximately radial to a wheel in engagement with said seat.

2. In an automobile block of the type set forth, the combination with a body portion of general frusto-conical form, of laterally extending wings at the smaller end thereof, a seat between said wings for the reception of the wheel of a vehicle, the axis of said body portion inclining with respect to its base so as to lie on a line approximately radial to a wheel in engagement with said seat.

3. In an automobile block of the type set forth, the combination with a body portion of general frusto-conical form, of laterally extending wings at the smaller end thereof, a seat between said wings for the reception of the wheel of a vehicle, the axis of said body portion inclining with respect to its base so as to lie on a line approximately radial to a wheel in engagement with said seat, said seat being formed with downturned flanges at its front and rear edges, substantially as and for the purpose set forth.

4. In an automobile block of the type set forth, the combination with a tubular body portion having an attaching flange about its larger end, of laterally extending wings at the smaller end of said body portion, a seat between said wings for the reception of the wheel of a vehicle, the axis of said body portion inclining with respect to its base so as to lie on a line approximately radial to a wheel in engagement with said seat.

Signed at Cleveland in the county of Cuyahoga and State of Ohio this 16th day May, 1924.

LEO P. HUGHES.